US012265318B2

United States Patent
Wu (10) Patent No.: US 12,265,318 B2
(45) Date of Patent: Apr. 1, 2025

(54) MULTI-DIRECTIONAL CONTROL DEVICE APPLIED TO WATERPROOF CASE OF CAMERA

(71) Applicant: SHENZHEN KAICHENGYI TECHNOLOGY CO., LTD, Shenzhen (CN)

(72) Inventor: Rikai Wu, Shenzhen (CN)

(73) Assignee: SHENZHEN KAICHENGYI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/743,156

(22) Filed: Jun. 14, 2024

(65) Prior Publication Data

US 2024/0329501 A1 Oct. 3, 2024

(30) Foreign Application Priority Data

May 13, 2024 (CN) .......................... 202421024779.6

(51) Int. Cl.
*G03B 17/56* (2021.01)
*G03B 17/08* (2021.01)

(52) U.S. Cl.
CPC ........... *G03B 17/563* (2013.01); *G03B 17/08* (2013.01)

(58) Field of Classification Search
USPC .................................... 396/25–29, 420, 439
See application file for complete search history.

(56) References Cited

U.S. PATENT DOCUMENTS

| 5,339,124 A * | 8/1994 | Harms .................. G03B 17/08 396/502 |
| 6,434,330 B1 * | 8/2002 | Uchiyama ............. G03B 17/08 396/29 |
| 2005/0083418 A1 | 4/2005 | Sasaki |
| 2008/0186379 A1 | 8/2008 | Ishigame et al. |
| 2014/0313301 A1 | 10/2014 | Wakai |
| 2023/0181263 A1 * | 6/2023 | Reimer ................. A61B 34/20 600/424 |

FOREIGN PATENT DOCUMENTS

| CN | 1163558 A | * 10/1997 | ............ A61B 17/29 |
| CN | 206672831 U | * 11/2017 | |
| CN | 206684458 U | * 11/2017 | |
| CN | 206710766 U | * 12/2017 | |

* cited by examiner

*Primary Examiner* — Clayton E. LaBalle
*Assistant Examiner* — Warren K Fenwick
(74) *Attorney, Agent, or Firm* — Hemisphere Law, PLLC; Zhigang Ma (57) ABSTRACT

The present disclosure discloses a multi-directional control device applied to a waterproof case of a camera, which includes a direction button driving mechanism, wherein the direction button driving mechanism is provided with a first toggle knob, a trigger lever, a transmission rod, and a transmission sliding block; the trigger lever has a fulcrum; the trigger lever is provided with an action section that rotates around the fulcrum; the action section is provided with a trigger part and a load-bearing part; the first toggle knob is connected with a first rotary rod; the first rotary rod is provided with a first push block; the transmission rod is provided with a roller; and the transmission sliding block is provided with a pressing part.

6 Claims, 7 Drawing Sheets

MULTI-DIRECTIONAL CONTROL DEVICE APPLIED TO WATERPROOF CASE OF CAMERA

TECHNICAL FIELD

The present disclosure relates to the field of waterproof cases of cameras, and in particular, to a multi-directional control device applied to a waterproof case of a camera.

BACKGROUND

A multi-selector of a digital camera is usually in the form of a circular pad or a group of buttons, which is used as a navigation tool. The multi-selector allows a user to activate navigate a camera menu, move a focus, and browse enlarged images in a replay mode, and further allows other functions to be achieved. The multi-selector typically includes five buttons for controlling up, down, left, and right directions, and a button located in a center of a space enclosed by the buttons (usually marked as "OK" or "SET" to confirm selections). When a user holds the camera, the multi-selector is usually ergonomically located within reach of the right thumb of the user.

For underwater photography, a waterproof case is used to prevent water from entering the camera and allow a user to access important functions of the camera from the outside of the case. To enable the waterproof case to achieve operations of the multi-selector on the camera, a person has mounted an operation pad (such as CN104335115B) on the waterproof case. However, this operation pad still has shortcomings. Specifically, a user operates the camera through the pad by pressing, but buttons can be triggered only under great force during operation (especially when a user wears gloves, it is harder for the user to perform operations), leading to the problem of inconvenience of operation by consumers. Secondly, direction buttons on the pad are located too close to a center button, making it easy for a user to accidentally touch other buttons in water.

Therefore, it is necessary to research a new technical solution to solve the above problems.

SUMMARY

To solve the defects and shortcomings in the prior art, the present disclosure provides a multi-directional control device applied to a waterproof case of a camera. Compared with the prior art, the multi-directional control device applied to the waterproof case of the camera operates the camera in the waterproof case by toggling, instead of pressing directional buttons of the camera, so that the multi-directional control device is more labor-saving, is in line with operation habits of some persons, and brings different operation selections for customers.

To achieve the above objectives, the present disclosure uses the following technical solutions:

A multi-directional control device applied to a waterproof case of a camera includes a direction button driving mechanism, wherein the direction button driving mechanism is provided with a first toggle knob, a trigger lever, a transmission rod, and a transmission sliding block;

the trigger lever has a fulcrum; the trigger lever is provided with an action section that rotates around the fulcrum; the action section is provided with a trigger part and a load-bearing part; the first toggle knob is connected with a first rotary rod; the first rotary rod is provided with a first push block configured to push the transmission rod; the transmission rod is provided with a roller configured to push the transmission sliding block; the transmission sliding block is provided with a pressing part configured to press the load-bearing part of the trigger lever;

during working, the first toggle knob is turned. The first toggle knob drives the first push block to push the transmission rod to move; and the roller of the transmission rod pushes the transmission sliding block to move and press the load-bearing part of the trigger lever, so that the action section of the trigger lever rotates around the fulcrum and the trigger part triggers a button of the camera.

As a preferred solution, the transmission rod is arranged in a horizontal direction, and the transmission sliding block is arranged in an up-down direction.

As a preferred solution, the transmission sliding block is provided with a pushing slope adapted to the roller; and the first rotary rod is provided with a reset torsion spring.

As a preferred solution, the first push block is provided with a hook-shaped push part.

As a preferred solution, the multi-directional control device further includes a middle button driving mechanism.

As a preferred solution, the middle button driving mechanism includes a second toggle knob, a first transmission lever, and a second transmission lever; the second toggle knob is connected to a second rotary rod; the second rotary rod is provided with a second push block; the second push block acts on one side of a fulcrum of the first transmission lever, and the other side of the fulcrum of the first transmission lever is configured to act on the second transmission lever; and the second lever is provided with a trigger part configured to press the button of the camera.

Compared with the prior art, the present disclosure has outstanding advantages and beneficial effects. Specifically, according to the above technical solutions, firstly, the multi-directional control device applied to the waterproof case of the camera mainly operates the camera in the waterproof case by toggling, instead of pressing directional buttons of the camera, so that the multi-directional control device is more labor-saving, is in line with operation habits of some persons, and brings different operation selections for consumption. Secondly, the specific design of the control device of the present disclosure also has the advantages of easy operation, reliability, and the like.

To make the structural features and effects of the present disclosure clearly, the present disclosure will be further described in detail below in combination with the accompanying drawings and specific embodiments.

REFERENCE NUMERALS

10: first toggle knob; 101: first rotary rod; 102: reset torsion spring; 11: trigger lever; 111: trigger part; 112: load-bearing part; 12: transmission rod; 121: roller; 13: transmission sliding block; 131: pressing part; 132: pushing slope; 14: first push block; 141: push part; 21: first mounting block; 211: first rotating shaft; 212: first mounting slot; 213: second rotating shaft; 22: second mounting block; 222: reset spring; 23: third mounting block; 231: mounting hole; 232: second mounting slot 31: second toggle knob; 311: second rotary rod; 32: first transmission lever; 33: second transmission lever; 34: second push block; and 40: waterproof case.

DETAILED DESCRIPTION OF THE EMBODIMENTS

The technical solutions in the embodiments of the present disclosure are clearly and completely described below with reference to the accompanying drawings. Apparently, the described embodiments are merely preferred embodiments of the present disclosure.

It should be noted that when an element is referred to as being "fixed to" another element, the element can be directly on another component or there can be a centered element. When an element is considered to be "connected" to another element, the element can be directly connected to another element or there may be a centered element. The terms "vertical", "horizontal", "left", "right", and similar expressions used herein are for illustrative purposes only and do not necessarily represent the only implementation.

Unless otherwise defined, all technical and scientific terms used herein have the same meaning as those commonly understood by a person skilled in the art to which the present disclosure belongs. The terms used in this specification of the present disclosure are merely intended to describe objectives of the specific implementations, but are not intended to limit the present disclosure. The term "and/or" used herein includes any and all combinations of one or more related listed items.

Figure 1:
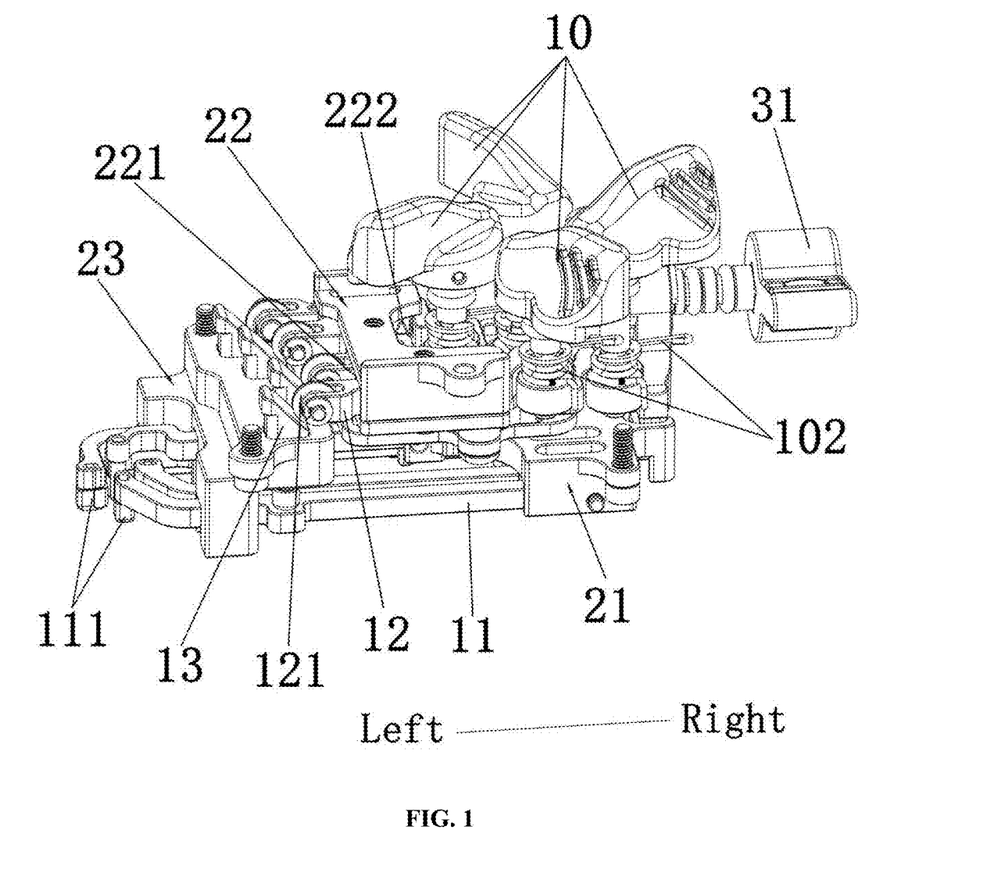
FIG. 1 is a first three-dimensional structural diagram according to an embodiment of the present disclosure.
Figure 2:
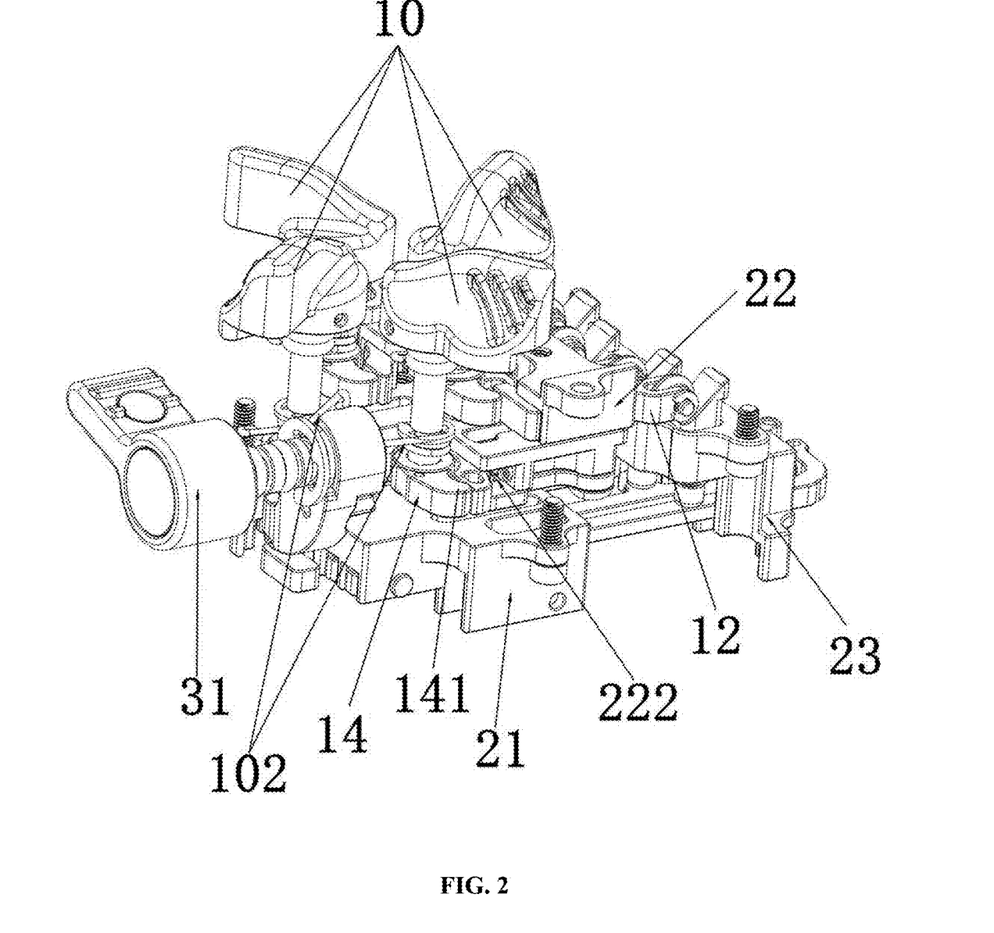
FIG. 2 is a second three-dimensional structural diagram according to an embodiment of the present disclosure.
Figure 3:
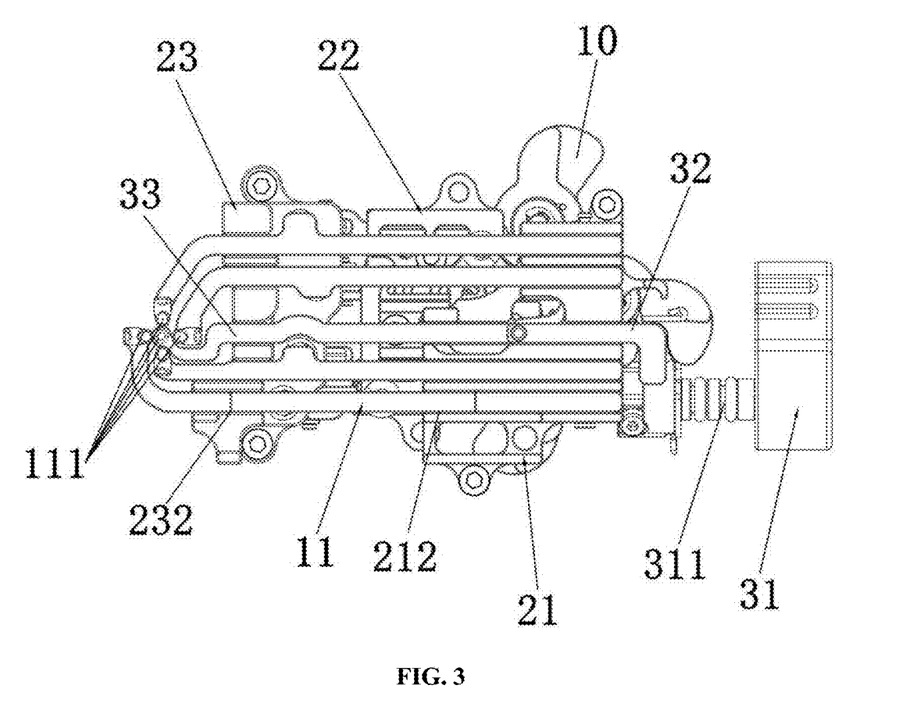
FIG. 3 is a third three-dimensional structural diagram according to an embodiment of the present disclosure.
Figure 4:
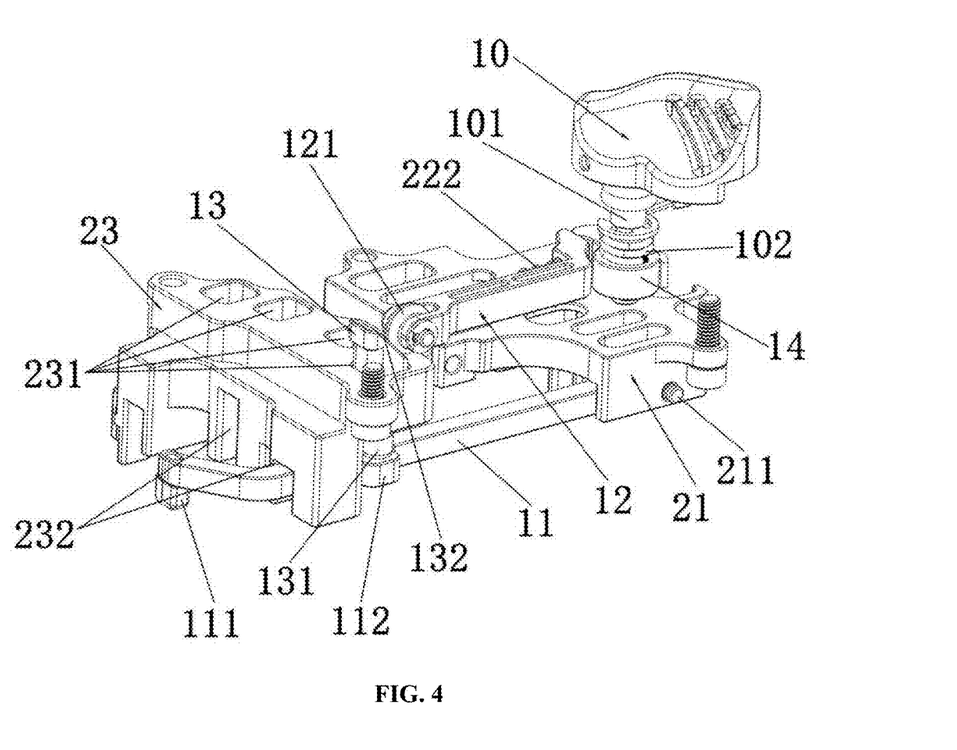
FIG. 4 is a first partially structural diagram according to an embodiment of the present disclosure.
Figure 5:
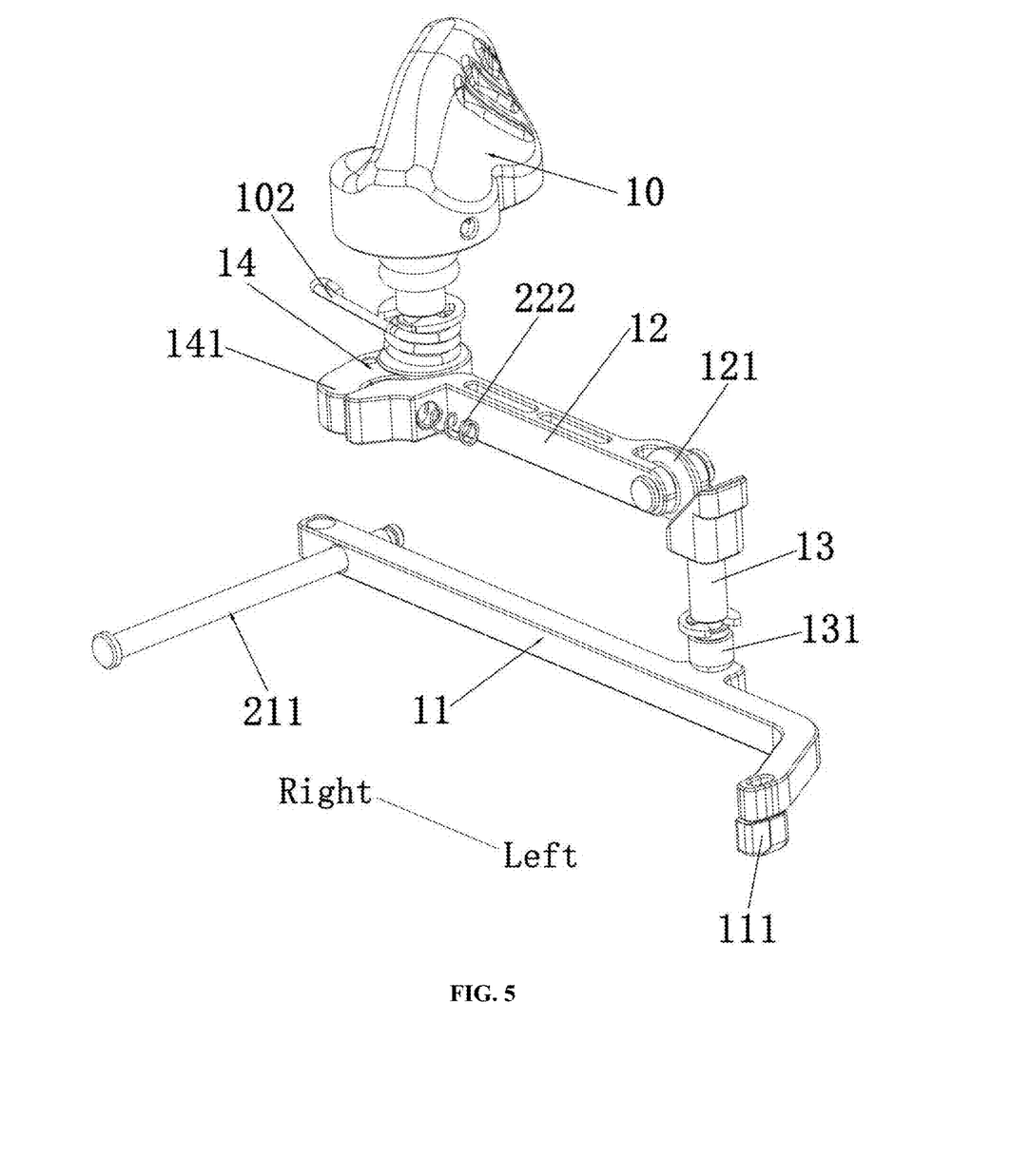
FIG. 5 is a second partially structural diagram according to an embodiment of the present disclosure.
Figure 6:
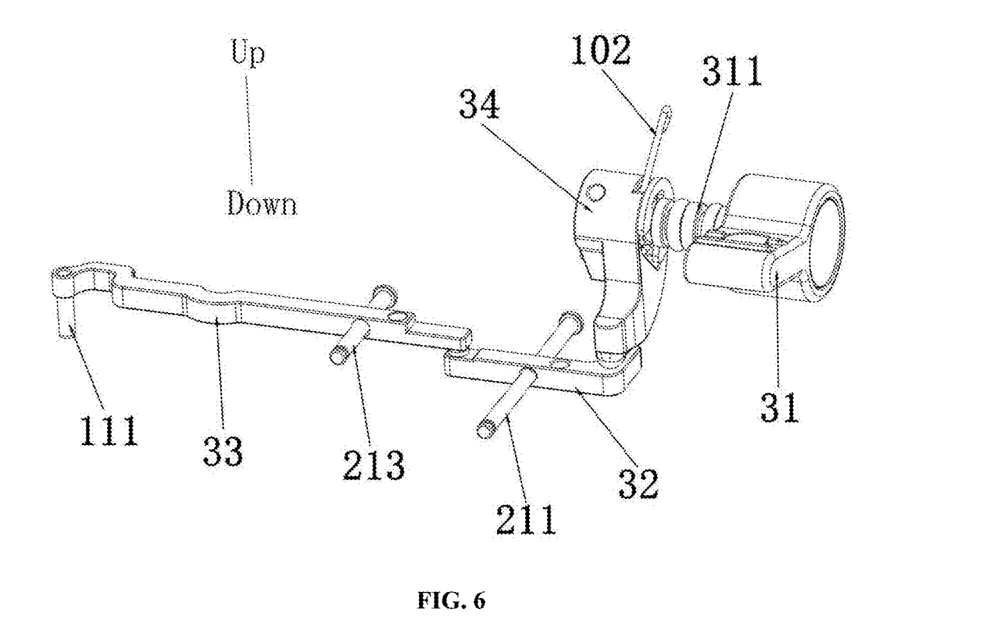
FIG. 6 is a third partially structural diagram according to an embodiment of the present disclosure.
Figure 7:
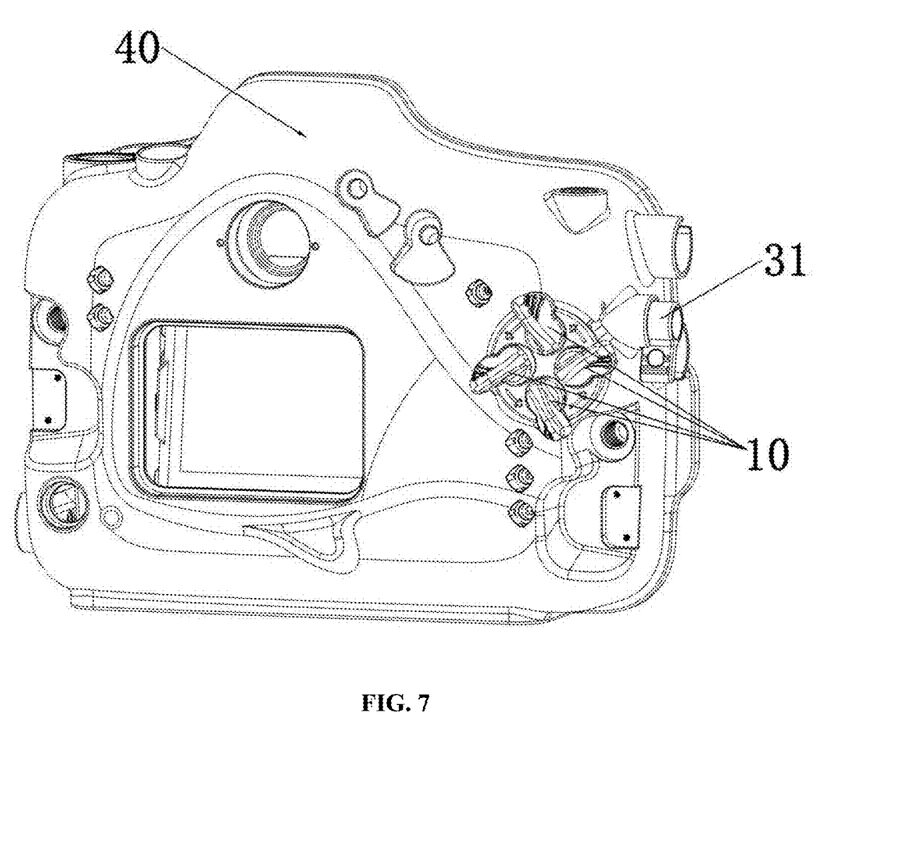
FIG. 7 is a schematic diagram of an application according to an embodiment of the present disclosure.

Referring to FIG. 1 to FIG. 6, a multi-directional control device applied to a waterproof case of a camera in an embodiment of the present disclosure includes a direction button driving mechanism, wherein the direction button driving mechanism is provided with a first toggle knob 10, a trigger lever 11, a transmission rod 12, and a transmission sliding block 13;

the trigger lever 11 has a fulcrum; the trigger lever 11 is provided with an action section that rotates around the fulcrum; the action section is provided with a trigger part 111 and a load-bearing part 112; the first toggle knob 10 is connected with a first rotary rod 101; the first rotary rod 101 is provided with a first push block 14 configured to push the transmission rod 12; the transmission rod 12 is provided with a roller 121 configured to push the transmission sliding block 13; and the transmission sliding block 13 is provided with a pressing part 131 configured to press the load-bearing part 112 of the trigger lever 11.

Preferably, the transmission rod 12 is arranged in a horizontal direction, and the transmission sliding block 13 is arranged in an up-down direction. An upper end of the transmission sliding block 13 is provided with a pushing slope 132 that is adapted to the roller 121. When the transmission rod 12 is pushed (moved), the roller 121 is in contact with the pushing slope 132 and drives the transmission sliding block 13 to move downwards through the pushing slope 132. A lower end of the transmission sliding block 13 is provided with a pressing part 131 (the pressing part 131 is usually cylindrical).

Specifically, the multi-directional control device further includes a first mounting block 21, a second mounting block 22, and a third mounting block 23. The first mounting block 21, the second mounting block 22, and the third mounting block 23 are arranged in sequence from right to left in this embodiment. The first mounting block 21 is provided with a first rotating shaft 211 arranged in a front-back direction. The trigger lever 11 is provided with a rotating hole adapted to the first rotating shaft 211. The first rotating shaft 211 passes through the rotating hole, thus forming a fulcrum of the trigger lever 11. The first mounting block 21 is further provided with a first mounting slot 212 that is adapted to the trigger lever 11. A right section of the trigger lever 11 is located in the first mounting slot 212. This not only plays a role in pre-positioning and facilitating mounting, but also has the advantage of improving the working stability.

The second mounting block 22 is provided with a guide slot that extends transversely towards the left and right. The transmission rod 12 is located in the guide slot in a manner of moving left and right, and the roller 121 is connected to a left end of the transmission rod 12 and is located outside the guide slot. The transmission sliding block 13 is located on a left side of the roller 121. When the transmission rod 12 moves to the left side, the roller 121 pushes the transmission sliding block 13 to move downwards. The second mounting block 22 is further provided with a reset spring 222 configured to drive a push rod to be reset.

The third mounting block 23 is provided with a mounting hole 231 that penetrates through the third mounting block in the up-down direction, and the transmission sliding block 13 is mounted in the mounting hole 231 in a manner of moving up and down. Meanwhile, an elastic reset member configured to drive the transmission sliding block 13 to be reset is further arranged in the mounting block 231, and the elastic reset member can be a spring sleeving the transmission sliding block. The third mounting block 23 is further provided with a second mounting slot 232. A left section of the trigger lever 11 is located in the second mounting slot 232. Preferably, the trigger part 111 of the trigger lever 11 is located on a left side of the third mounting block 23, and the load-bearing part 112 is located on a right side of the second mounting slot 232.

In practical applications, the first rotary rod 101 is sleeved with a reset torsion spring 102 and several limiting rings, thereby ensuring the working stability and rotation handfeel of the first rotary rod 101. This is a conventional technique and will not be elaborated here. The first push block 14 is provided with a hook-shaped push part 141, and the transmission rod 12 is provided with a force-bearing wall surface adapted to the push part 141 (the force-bearing wall surface is usually a straight wall surface). The first mounting block 21, the second mounting block 22, and the third mounting block 23 can be fixedly connected to the waterproof case through connecting screws.

During working, the first toggle knob 10 is turned. The first toggle knob 10 drives the first push block 14 to push the transmission rod 12 to move horizontally to the left; and the roller 121 of the transmission rod 12 pushes the transmission sliding block 13 to move downwards and press the load-bearing part 112 of the trigger lever 11, so that the action section of the trigger lever 11 rotates downwards around the fulcrum and the trigger part 111 of the trigger lever 11 triggers a button of the camera.

Further, in practical applications, the multi-directional control device of the present disclosure is provided with four groups of direction button driving mechanisms, and the four first toggle knobs 10 are arranged at four corners, corresponding to direction buttons of four buttons of the camera (up, down, left, and right). Preferably, trigger directions of the four first toggle knobs 10 are the same (all the first toggle knobs are triggered clockwise or counterclockwise). In this way, it is more in line with an operation habit of a user. It should be added that in practical applications, for avoidance, specific shapes and structures of the transmission rods 12 and the trigger levers 11 which are driven by the four first toggle knobs 10 are different, but their functions and implementations in the entire driving mechanism are roughly the same. Correspondingly, the first mounting block 21 is provided with a corresponding number of first mounting slots 212; the second mounting block 22 is provided with a corresponding number of guide slots; and the third mounting block 23 is provided with a corresponding number of second mounting slots 232.

During use, the multi-directional control device further includes a middle button driving mechanism, which has roughly the same principle as the direction button driving mechanism mentioned above. Specifically, the middle button driving mechanism includes a second toggle knob 31, a first transmission lever 32, and a second transmission lever 33; the second toggle knob 31 is connected to a second rotary rod 311; the second rotary rod 311 is provided with a second push block 34; the first transmission lever 32 is provided with a rotating hole; and the rotating hole passes through the foregoing first rotating shaft 211 to form a fulcrum of the first transmission lever 32. The first mounting block 21 is provided with a second rotating shaft 213, and the second transmission lever 33 has a rotating hole. The rotating hole of the second transmission lever 33 passes through the second rotating shaft 213, thus forming a fulcrum of the second transmission lever 33. The second push block 34 acts on one side (right side) of the fulcrum of the first transmission lever 32, and the other side (left side) of the fulcrum of the first transmission lever 32 acts on the second transmission lever 33. Specifically, in conjunction with the accompanying drawings, when the second toggle knob 31 is turned downwards, the second toggle knob 31 drives the second push block 34 to downwards press the first transmission lever 32. A left section of the first transmission lever 32 upwarps, thereby acting on the second transmission lever 33. A right section of the second transmission lever 33 rotates upwards around its fulcrum, and a left section of the second transmission lever 33 rotates downwards around its fulcrum, thereby triggering a middle button of the camera.

The design focus of the present disclosure is that compared with the prior art, the multi-directional control device applied to the waterproof case of the camera operates the camera in the waterproof case by toggling, instead of pressing directional buttons of the camera, so that the multi-directional control device is more labor-saving, is in line with operation habits of some persons, and brings different operation selections for consumption. Secondly, the specific design of the control device of the present disclosure also has the advantages of easy operation, reliability, and the like.

The above only describes the preferred embodiments of the present disclosure, but is not intended to impose any limitations on the technical scope of the present disclosure. Any subtle modifications, equivalent changes, or embellishments made to the above embodiments according to the technical essence of the present disclosure shall all fall within the scope of the technical solutions of the present disclosure.

What is claimed is:

1. A multi-directional control device applied to a waterproof case of a camera, comprising a direction button driving mechanism, wherein the direction button driving mechanism is provided with a first toggle knob, a trigger lever, a transmission rod, and a transmission sliding block;

the trigger lever has a fulcrum; the trigger lever is provided with an action section that rotates around the fulcrum; the action section is provided with a trigger part and a load-bearing part; the first toggle knob is connected with a first rotary rod; the first rotary rod is provided with a first push block configured to push the transmission rod; the transmission rod is provided with a roller configured to push the transmission sliding block; the transmission sliding block is provided with a pressing part configured to press the load-bearing part of the trigger lever;

wherein, the first toggle knob is configured to be turned to drive the first push block to push the transmission rod to move; and movement of the transmission rod is capable of bringing the roller of the transmission rod to push the transmission sliding block to move to press the load-bearing part of the trigger lever, so that the action section of the trigger lever rotates around the fulcrum and the trigger part triggers a button of the camera.

2. The multi-directional control device applied to the waterproof case of the camera according to claim 1, wherein the transmission rod is arranged in a horizontal direction, and the transmission sliding block is arranged in an up-down direction.

3. The multi-directional control device applied to the waterproof case of the camera according to claim 2, wherein the transmission sliding block is provided with a pushing slope adapted to the roller; and the first rotary rod is provided with a reset torsion spring.

4. The multi-directional control device applied to the waterproof case of the camera according to claim 3, wherein the first push block is provided with a hook-shaped push part.

5. The multi-directional control device applied to the waterproof case of the camera according to claim 2, further comprising a middle button driving mechanism.

6. The multi-directional control device applied to the waterproof case of the camera according to claim 5, wherein the middle button driving mechanism comprises a second toggle knob, a first transmission lever, and a second transmission lever; the second toggle knob is connected to a second rotary rod; the second rotary rod is provided with a second push block; the second push block acts on one side of a fulcrum of the first transmission lever, and the other side of the fulcrum of the first transmission lever is configured to act on the second transmission lever; and the second transmission lever is provided with a trigger part configured to press the button of the camera.

* * * * *